UNITED STATES PATENT OFFICE.

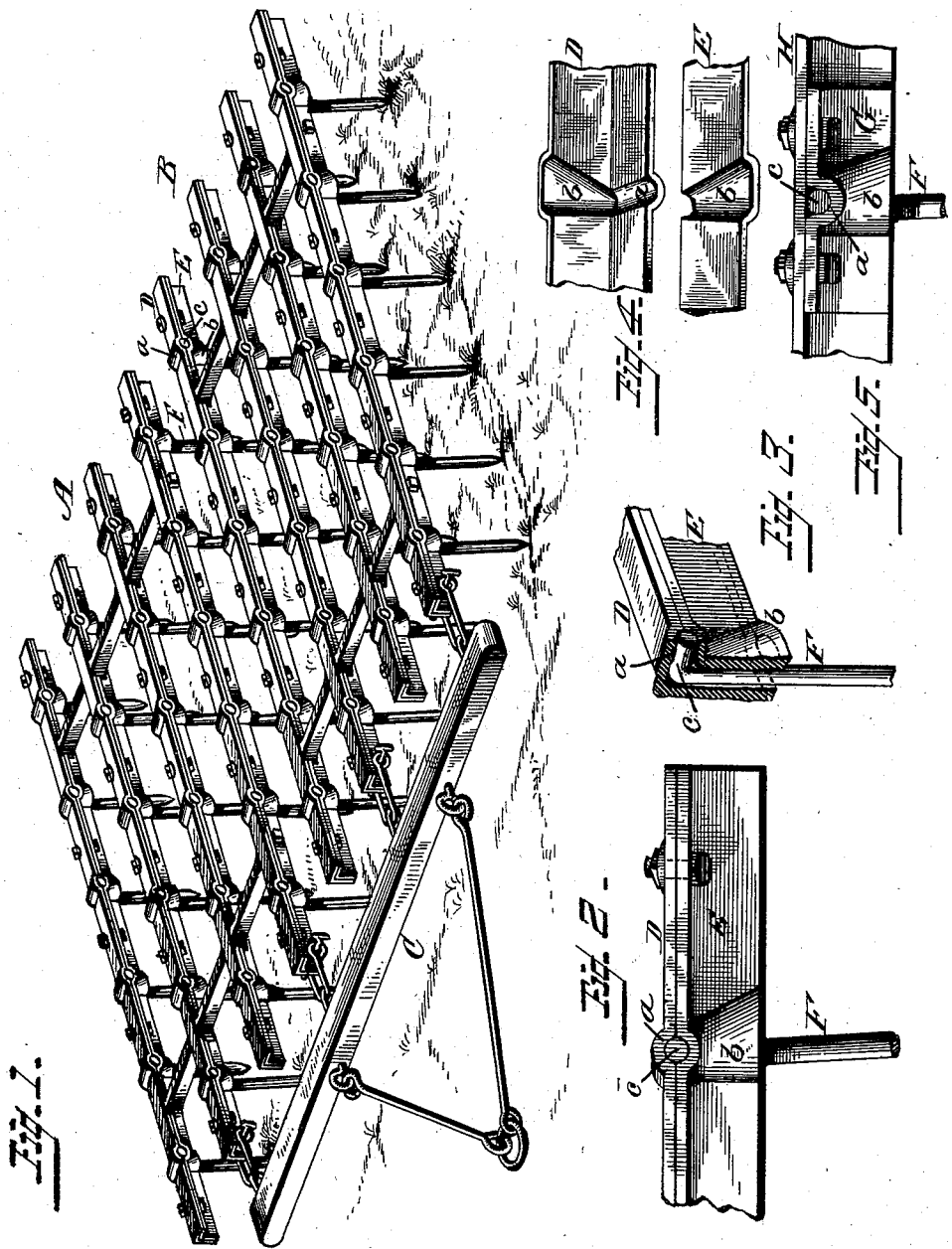

CHARLES A. BROSTROM, OF ROCK ISLAND, ILLINOIS.

HARROW.

SPECIFICATION forming part of Letters Patent No. 334,342, dated January 12, 1886.

Application filed June 24, 1885. Serial No. 169,675. (No model.)

*To all whom it may concern:*

Be it known that I, CHARLES A. BROSTROM, a citizen of the United States, residing at Rock Island, in the county of Rock Island and State of Illinois, have invented certain new and useful Improvements in Harrows; and I do hereby declare that the following is a full, clear, and exact description of the same, reference being had to the annexed drawings, making a part of this specification, and to the letters and figures of reference marked thereon.

Figure 1 of the drawings is a perspective view of a harrow constructed in accordance with my invention; Fig. 2, a side elevation of a portion of one of the beams with the tooth connected thereto; Fig. 3, a cross-section of the same in perspective; Fig. 4, detail views in perspective of the two sections of plates forming the harrow-beam, and Fig. 5 a detail view showing a modification of the invention.

The present invention has relation to that class of harrows having their teeth pivotally connected to the beams thereof, and is designed, more particularly, as an improvement upon my former patent, dated December 18, 1883, No. 290,525, wherein the harrow-tooth at its upper end was bent at right angles to the body portion to enter a perforation in the upright portion of the L-shaped beam, and the tooth passing down through an angular slot in the horizontal portion or base of the beam, thus pivotally connecting the teeth to admit of their adjustment.

The object of the present invention is to dispense with the perforations and slots in the harrow-beam, as it has been found to not only weaken the beam, but the constant wear of the perforations would in time result in the fastening-pin which secures the teeth becoming loose, and consequently render the teeth of the harrow less effective. These objects I attain by the construction substantially as shown in the drawings, and hereinafter described and claimed.

In the accompanying drawings, A B represent the two harrow-sections, suitably connected to a double-tree, C. In the present instance I have shown the harrow-beams composed of two L-shaped plates, D E, and unlike the beams in my former patent, the horizontal portion thereof is uppermost, thus giving greater strength to that portion of the beam where the teeth are pivoted and is most required. The plates D E have each upon their inner sides depressions *a b*, formed by first heating the plates, and by a machine or die brought down upon the plates the depressions are made. This, however, may be done by any suitable means found most convenient—such as the common method of swaging or stamping. When the plates D E are thus formed, they are bolted together with the teeth F between them, thus forming an inverted L-shaped beam, the right-angle portion of the tooth resting in the groove formed by the depressions *a* in the plates, while the upright portion of the tooth immediately below the heads or angle portion *c* is in the groove formed by the depressions *b*.

As will be noticed by reference to Figs. 2 and 4, the grooves formed by the depressions *a* are at an acute angle with the length of the beam or diagonal, as is also the head *c* of the tooth, thereby rendering the tooth more readily adjusted. The socket or groove formed by the depressions *b*, which guides the play of the tooth, is flaring, its greatest width being at its lowest end.

The depressions *a b*, when taken together, form a right-angle groove or socket for the head and body portion of the tooth, which does not weaken the harrow-beam, there being no perforation or slots in the beam, and consequently its strength is not impaired, but on the contrary increased, and there being no pins, screw-nuts, or other fastenings to secure the teeth in place, the danger of the teeth becoming loose is obviated.

If preferred, one of the L-shaped plates may be constructed in short sections, as shown at G, Fig. 5, and bolted or otherwise fastened to the plate H, the plate-sections G alone having the depressions, while the plate H may be perfectly plain or without them. The harrow-beams, composed of two sections, as shown in Fig. 1, are preferably connected together by screw-bolts and nuts, so that the sections may be tightened together to compensate for wear, thus tightening the teeth and preventing them from working loose. This feature is equally applicable where the sockets are formed on short sections of plate, as in Fig. 5.

Having now fully described my invention, what I claim as new, and desire to secure by Letters Patent, is—

In a harrow, the combination, with the teeth thereof having angular heads, of an inverted L-shaped beam composed of two L-shaped plates suitably connected together and formed with an angular groove flaring at its lower end, substantially as and for the purpose set forth.

In testimony that I claim the above I have hereunto subscribed my name in the presence of two witnesses.

CHARLES A. BROSTROM.

Witnesses:
OLIVER OLSEN,
GUSTAV ANDREEN.